Patented Oct. 26, 1943

2,332,870

UNITED STATES PATENT OFFICE 2,332,870

PROCESS FOR THE MANUFACTURE OF CELLULAR RUBBER

Louis Emile Henri Pagnon, Paris, France; vested in the Alien Property Custodian

No Drawing. Application November 25, 1939, Serial No. 306,197. In France November 14, 1938

2 Claims. (Cl. 260—722)

The present invention relates to a process for the manufacture of cellular rubber having fluid-tight cells. It is known that this product can be manufactured by vulcanizing a mass of rubber in the presence of a gas at a very high pressure, of the order of 300 to 600 atmospheres, and then subjecting the product thus obtained to a second vulcanization, at a temperature equal to or greater than that of the first, in a finishing or expansion mould in which the rubber having fluid-tight cells filled with gas assumes its final dimensions by expanding. However, there exists another process according to which this expansion of the vulcanized mass containing the gas under pressure is not effected in a mould at high temperature, but by simply staying in hot water or in hot air at a much lower temperature than the vulcanization temperature, for example of the order of 80° C. Nevertheless it has been observed that when this latter process was applied to a mass solely composed of plantation rubber to which had simply been added the products required for the vulcanization, a stable product having really fluid-tight cells was not obtained, so that the cellular rubber thus manufactured would not retain the gases. In order to overcome this drawback, up to 50% of balata gum and also waxy and resinous substances are mixed with the crude plantation rubber, which has the effect of closing the cells. However, balata gum is an expensive substance which is rather irregular in quality and is often difficult to obtain.

The purpose of the process which is the object of the present invention is to eliminate the use of balata gum in the mixture used for the manufacture of cellular rubber; it is characterized by the fact that a part of the mixture of pure gums used for this manufacture is subjected to a pre-treatment, the purpose of which is to decrease or to delay the effects of the vulcanization on this part of the mixture, the result of which is that in the finished product, said part of the mixture remains more plastic, whereas the remainder is more resilient.

The patentee has discovered in fact that the plasticity of the part of the mixture in which vulcanization was delayed was sufficient to permit of a subsequent expansion of the cells without breaking down their walls, whereas the part of the mixture formed by rubber which has been subjected under the same conditions to a much more complete vulcanization, imparted the required elasticity to the final product.

The pre-treatment applied to a part of the mixture used for the manufacture of cellular rubber, in order to retain the plasticity of said part in the final product, is based on the known fact that the capacity of rubber for vulcanization depends on its state of polymerization and that the more completely the rubber is depolymerized, the longer has to be the vulcanization to obtain the same result, whereas for the same time of vulcanization, a more complete depolymerization produces a decrease in the modulus of elasticity and therefore a less resilient and more plastic product. According to the invention, it is therefore possible to subject a part of the rubber forming the mixture to any treatment which is capable of decreasing its natural elasticity by depolymerization, and such treatment may be mechanical or chemical.

The desired result may be obtained in particular by subjecting crude plantation rubber to an operation of mixing, or of premastication, of long duration in a mixer provided with cooled cylinders which are kept at a temperature of the order of 20 to 30° C. For example, a mixture of gums may be used comprising 50% of plantation crepe that has been subjected to mixing for about 1 hour 45 minutes, and 50% of smoked sheets that have been subjected to mixing for only 30 minutes, these two components being then mixed by means of a mixing operation of about 10 minutes followed by the introduction of the fillers and of the vulcanizing agents.

The plastification of the rubber may also be obtained by means of a mastication operation of relatively short duration, but at a high temperature, of the order of 200° C.

This result may again be obtained without mechanical work, by simply oxidizing the crude rubber which, in this case is cut in pieces and dried in the hot state in vacuum drying ovens and then suddenly placed in the presence of air from which it absorbs the oxygen, thereby effecting the copolymerization and producing an equivalent result to the plastification obtained mechanically.

It is also possible to use as the plastic component of the mixture used for the manufacture of cellular rubber according to the invention, a natural or synthetic rubber which has been subjected to various chemical treatments that have the effect of imparting to it as regards vulcanization the same properties as those of considerably depolymerized rubber, for example chlorinated, brominated, hydrogenated rubber or the like, or again synthetic rubbers specially prepared so as to impart to them a low capacity for vulcanization.

The process according to the invention enables the cost of manufacture of cellular rubber to be substantially decreased, owing to the elimination of the use of balata gum or of gutta percha, and, by expansion in hot water or hot air of the mass that has been vulcanized in the gas under pressure, a product to be obtained which is equivalent to that obtained by expansion at high temperature in a finishing mould. However, a mixture of rubber treated according to the present invention can also be successfully used in this latter case.

I claim:

1. A vulcanized cellular rubber product having fluid-tight cells containing gas at high pressure, the body of said product consisting essentially of an admixture of equal parts of plantation crepe which has been milled for a period of about one and three-fourths hours at between 20 to 30° C., and of smoked sheet rubber which has been milled for about thirty minutes at the same approximate temperature.

2. In the method of manufacturing cellular rubber having fluid-tight cells by dissolving a gas at high pressure in a mass of crude plantation rubber and expanding the gas-containing mass, the steps of subjecting a substantial portion of plantation crepe not exceeding fifty per cent of the total mass to a mastication for about one and three-fourths hours at between 20 and 30° C., separately masticating an equal portion of smoked sheet rubber for about thirty minutes at the same approximate temperature, and masticating the mixture of these two masses together for about ten minutes at the same approximate temperature.

LOUIS EMILE HENRI PAGNON.